US011397734B2

(12) United States Patent
Ma et al.

(10) Patent No.: US 11,397,734 B2
(45) Date of Patent: Jul. 26, 2022

(54) DYNAMIC ROUTING METHOD AND APPARATUS FOR QUERY ENGINE IN PRE-COMPUTING SYSTEM

(71) Applicant: Kuyun (Shanghai) Information Technology Co., Ltd., Shanghai (CN)

(72) Inventors: Hongbin Ma, Shanghai (CN); Yang Li, Shanghai (CN); Qing Han, Shanghai (CN)

(73) Assignee: KUYUN (SHANGHAI) INFORMATION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/051,014

(22) PCT Filed: Mar. 4, 2020

(86) PCT No.: PCT/CN2020/077715
§ 371 (c)(1),
(2) Date: Oct. 27, 2020

(87) PCT Pub. No.: WO2020/199832
PCT Pub. Date: Oct. 8, 2020

(65) Prior Publication Data
US 2022/0012243 A1 Jan. 13, 2022

(30) Foreign Application Priority Data
Apr. 1, 2019 (CN) .......................... 201910258123.8

(51) Int. Cl.
*G06F 16/2453* (2019.01)
*G06F 16/2455* (2019.01)
*G06F 16/22* (2019.01)

(52) U.S. Cl.
CPC .... *G06F 16/24545* (2019.01); *G06F 16/2264* (2019.01); *G06F 16/24556* (2019.01)

(58) Field of Classification Search
CPC ......... G06F 16/24545; G06F 16/24556; G06F 16/2264
(Continued)

(56) References Cited

U.S. PATENT DOCUMENTS 6,108,647 A * 8/2000 Poosala .............. G06Q 30/0283
8,452,804 B2 * 5/2013 Bakalash ................ G06F 16/30
707/769

(Continued)

FOREIGN PATENT DOCUMENTS

CN  103916478 A * 7/2014 ....... G06F 17/30592
CN  103916478 A    7/2014
(Continued)

OTHER PUBLICATIONS

International Search Report Application No. PCT/CN2020/077715; dated Jun. 12, 2020; pp. 4.
(Continued)

*Primary Examiner* — Giovanna B Colan
(74) *Attorney, Agent, or Firm* — Cantor Colburn LLP

(57) ABSTRACT

The present application discloses a dynamic routing method and apparatus for a query engine in a pre-computing system. The method includes: pre-obtaining cube data under a preset dimensional combination in a pre-computing system; determining a degree of aggregation of the cube data selected as expected under the preset dimensional combination after a query request is received; executing query processing on the query request in a first distributed query engine when the degree of aggregation of the cube data under the preset dimensional combination is high; and switching to a second distributed query engine to execute query processing on the query request when the degree of aggregation of the cube data under the preset dimensional combination is low. The present application solves the technical problem that the (Continued)

query response speed of the pre-computing query system is not ideal. Through the present application, the sub-second high-performance query response can be achieved. At the same time, as a result, higher concurrency can be supported so as to meet business needs, and the stability of the query system is simultaneously guaranteed.

10 Claims, 10 Drawing Sheets

(58) Field of Classification Search
USPC ...................................... 707/718, 601, 769, 1
See application file for complete search history.

(56) References Cited

U.S. PATENT DOCUMENTS

| | | | | |
|---|---|---|---|---|
| 2010/0198777 A1* | 8/2010 | Lo | ........................ | G06F 16/283 |
| | | | | 707/E17.014 |
| 2013/0339291 A1* | 12/2013 | Hasner | .................. | G06F 16/283 |
| | | | | 707/601 |
| 2017/0116281 A1* | 4/2017 | Roytman | ................ | G06F 16/22 |

FOREIGN PATENT DOCUMENTS

| | | | | | |
|---|---|---|---|---|---|
| CN | 106484875 A | * | 3/2017 | ......... | G06F 16/2453 |
| CN | 106484875 A | | 3/2017 | | |
| CN | 106897386 A | * | 6/2017 | ......... | G06F 16/2264 |
| CN | 106897386 A | | 6/2017 | | |
| CN | 106997386 A | | 8/2017 | | |
| CN | 107609130 A | * | 1/2018 | | |
| CN | 107609130 A | | 1/2018 | | |
| CN | 108376143 A | * | 8/2018 | ........... | G06F 16/244 |
| CN | 108376143 A | | 8/2018 | | |
| CN | 110110165 A | * | 8/2019 | ......... | G06F 16/2264 |
| CN | 110110165 A | | 8/2019 | | |

OTHER PUBLICATIONS

English Translation of First Chinese Office Action Application No. 201910258123.8 dated Oct. 29, 2020, pp. 7.

* cited by examiner

DYNAMIC ROUTING METHOD AND APPARATUS FOR QUERY ENGINE IN PRE-COMPUTING SYSTEM

CROSS-REFERENCE TO RELATED APPLICATIONS

This application is a National Phase of PCT Application No. PCT/CN2020/077715 filed Mar. 4, 2020 which claims priority to Chinese Application No. 2019102581238 filed on Apr. 1, 2019, entitled "DYNAMIC ROUTING METHOD AND APPARATUS FOR QUERY ENGINE IN PRE-COMPUTING SYSTEM", which is incorporated herein by reference in its entirety.

FIELD

The present application relates to fields of computers and data analysis, and more particularly, to a dynamic routing method and apparatus for a query engine in a pre-computing system.

BACKGROUND

A pre-computing query system can utilize spare computing and storing resources to complete part of computing in advance, and save results of the computing in a persistent storing medium. When a user query arrives, only a small amount of data reprocessing is required to answer the user query.

The inventor finds that in a distributed computing environment, the query response speed of the pre-computing query system is still not ideal. Furthermore, use of a pre-computing result is also poor.

Regarding the problem that the query response speed of the pre-computing query system in a related art is not ideal, no effective solution has been proposed yet.

SUMMARY

A main objective of the present application is to provide a dynamic routing method and apparatus for a query engine in a pre-computing system, so as to solve the problem that the query response speed of the pre-computing query system is not ideal.

To achieve the above objective, according to one aspect of the present application, there is provided a dynamic routing method for a query engine in a pre-computing system.

The dynamic routing method for the query engine in the pre-computing system according to the present application includes:

Pre-obtaining cube data under a preset dimensional combination in the pre-computing system;

Determining a degree of aggregation of the cube data selected as expected under the preset dimensional combination after a query request is received;

Executing query processing on the query request in a first distributed query engine when the degree of aggregation of the cube data under the preset dimensional combination is high; and Switching to a second distributed query engine to execute query processing on the query request when the degree of aggregation of the cube data under the preset dimensional combination is low.

Further, when the degree of aggregation of the cube data selected as expected under the preset dimensional combination is determined after a query request is received, the method further includes: evaluating a cost result of executing the query request; and adjusting to select the first distributed query engine or the second distributed query engine according to the cost result when the cube data selected as expected under the preset dimensional combination are identical and/or overlapped.

Further, the executing query processing on the query request in a first distributed query engine when the degree of aggregation of the cube data under the preset dimensional combination is high includes: executing query processing on the query request in a scatter-and-gather first distributed query engine when the degree of aggregation of the cube data under the preset dimensional combination is high.

Further, the switching to a second distributed query engine to execute query processing on the query request when the degree of aggregation of the cube data under the preset dimensional combination is low includes: switching to a total-exchange second distributed query engine to execute query processing on the query request when the degree of aggregation of the cube data under the preset dimensional combination is low.

Further, after the switching to a second distributed query engine to execute query processing on the query request when the degree of aggregation of the cube data under the preset dimensional combination is low, the method further includes: determining the degree of aggregation of the cube data selected as expected under the preset dimensional combination after a query request is received again; and switching to the first distributed query engine to execute query processing on the query request when the degree of aggregation of the cube data under the preset dimensional combination becomes high from low.

To achieve the above objective, according to another aspect of the present application, there is provided a dynamic routing apparatus for a query engine in a pre-computing system.

The apparatus for the query engine in the pre-computing system according to the present application includes: a pre-storage module, configured to pre-obtain cube data under a preset dimensional combination in the pre-computing system; a determining module, configured to determine the degree of aggregation of the cube data selected as expected under the preset dimensional combination after receiving a query request; a first execution module, configured to execute query processing on the query request in a first distributed query engine when the degree of aggregation of the cube data under the preset dimensional combination is high; and a second executing module, configured to switch to a second distributed query engine to execute query processing on the query request when the degree of aggregation of the cube data under the preset dimensional combination is low.

Further, the apparatus further includes a cost rule module which includes an evaluation unit, configured to evaluate a cost result of executing the query request; and an adjustment unit, configured to adjust and select the first distributed query engine or the second distributed query engine according to the cost result when the cube data under the preset dimensional combination selected as expected are identical and/or overlapped.

Further, the first execution module includes: a first engine unit, configured to execute query processing on the query request in a scatter-and-gather first distributed query engine when the degree of aggregation of the cube data under the preset dimensional combination is high.

Further, the second execution module includes: a second engine unit, configured to switch to a total-exchange second distributed query engine to execute query processing on the query request when the degree of aggregation of the cube data under the preset dimensional combination is low.

Further, the apparatus further includes a dynamic adjustment module which includes a re-determining unit, configured to determine the degree of aggregation of the cube data under the preset dimensional combination selected as expected after a query request is received again; and an adjustment execution unit, configured to switch to a first distributed query engine to execute query processing on the query request when the degree of aggregation of the cube data under the preset dimensional combination becomes high from low.

According to the dynamic routing method and apparatus for the query engine in the pre-computing system in the embodiments of the present application, a mode for pre-obtaining cube data under the preset dimensional combination in the pre-computing system is used; by determining the degree of aggregation of the cube data selected as expected under the preset dimensional combination after the query request is received, the objectives of executing query processing on the query request in the first distributed query engine when the degree of aggregation of the cube data under the preset dimensional combination is high, and switching to the second distributed query engine to execute query processing on the query request when the degree of aggregation of the cube data under the preset dimensional combination is low are reached, thereby achieving the technical effects of stable utilization of a pre-computing result and quick response to a query request from a customer, and further solving the technical problem that the query response speed of the pre-computing query system is not ideal.

BRIEF DESCRIPTION OF THE DRAWINGS

The accompanying drawings, which form a part of the present application, serve to provide a further understanding of the present application, such that other features, objectives, and advantages of the present application become more apparent. The accompanying drawings of illustrative embodiments of the present application and the description of the drawings serve to explain the present application and are not construed as unduly limiting the present application. In the drawings.

DETAILED DESCRIPTION OF THE EMBODIMENTS

In order to enable those skilled in the art to better understand the solutions of the present application, the technical solutions in embodiments of the present application will be described below clearly and comprehensively in conjunction with accompanying drawings of the embodiments of the present application. Apparently, the embodiments described are merely some of rather than all of the embodiments of the present application. Based on the embodiments of the present application, all other embodiments obtained by those of ordinary skill in the art without inventive efforts shall fall within the scope of protection of the present application.

It should be noted that the terms "first", "second", and so forth, in the description and claims of the present application and in the above-described drawings, are used to distinguish between similar objects and are not necessarily to describe a particular order or sequential order. It should be understood that the data so used may be interchanged where appropriate in order to facilitate the embodiments of the present application described herein. In addition, the terms "comprising", "having", and any variations thereof are intended to cover non-exclusive inclusions, for example, processes, methods, systems, products, or devices that contain a series of steps or units need not be limited to those clearly listed steps or units, but may include other steps or units not explicitly listed or inherent to the processes, methods, products, or devices.

It should be noted that the embodiments in the present application and features in the embodiments can be combined with each other if there is no conflict. Hereinafter, the present application will be described in details with reference to the accompanying drawings and in conjunction with the embodiments.

A dynamic routing method for a query engine in a pre-computing system of the present application proposes an intelligent routing mechanism for a pre-computing query engine on the basis of a cost rule base and pre-computing meta-information, which allows the pre-computing query system to aim at shortening query response time, and simultaneously guaranteeing system stability. Also, automatic switching between different engines can be realized. A dynamic and intelligent query engine routing mechanism is realized, such that the performance, efficiency and stability of the pre-computing system can be improved.

Figure 1:
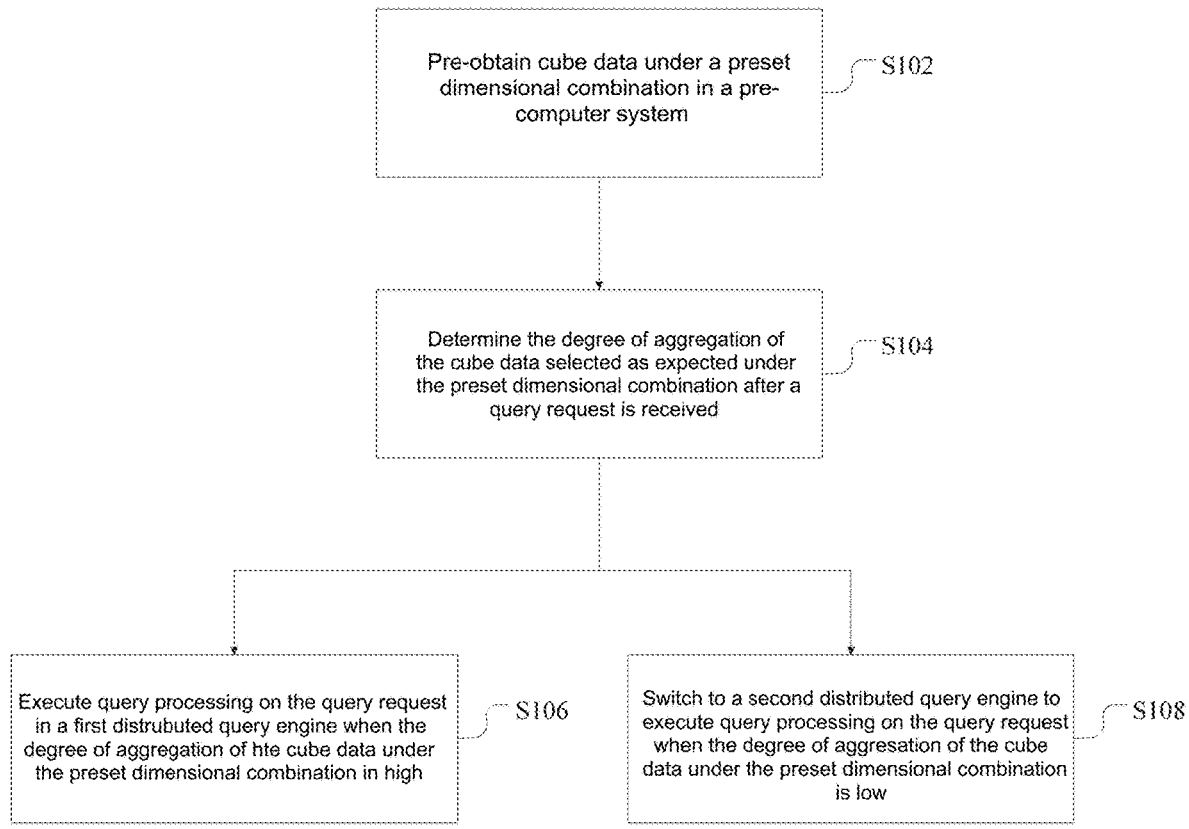
FIG. 1 is a schematic flowchart of a dynamic routing method for a query engine in a pre-computing system according to Embodiment I of the present application.

As shown in FIG. 1, the method includes the following steps S102 to S108:

Step S102: pre-obtaining cube data under a preset dimensional combination in the pre-computing system;

The pre-computing system used has the following characteristics: the pre-computing system can use an off-line operation in advance, and pre-compute a measurement result of aggregation according to dimensions as cube data, namely Cube data, wherein the Cube data are aggregated, and are subjected to dimensional screening and measurement, and therefore, the amount of the Cube data is generally much smaller than that of original data.

Further, the Cube data are a set of pre-computing results, each element in the set is a measurement result under a certain dimensional combination, and the Cube data are regarded as cube data under a preset dimensional combination, namely a Cuboid.

It can be understood that for different queries, cube data selected as expected or the cube data under the preset dimensional combination in the pre-computing query system are different.

According to the characteristics of the above pre-computing system, the number of rows, the size, cardinality and other characteristics of each pre-computed Cuboid can be known and cached in a system memory before a query request from a user is received.

Specifically, pre-obtaining cube data under a preset dimensional combination in the pre-computing system means that what a query engine in the pre-computing system faces is not the original data, but the aggregated Cube data or Cuboid.

Step S104: determining the degree of aggregation of the cube data selected as expected under the preset dimensional combination after a query request is received;

After the query request is received, it is necessary to determine the degree of aggregation of the cube data, namely Cuboid, selected as expected under the preset dimensional combination. For example, when a query selects a high-aggregation-level Cuboid, if the Cuboid is a Cuboid which is specifically aggregated according to the age dimension, the data amount of Cuboid that needs to be accessed to complete the query is very small; and if a query selects a low-aggregation-level Cuboid aggregated according to an insurer+date dimension, the data amount of Cuboid that needs to be accessed is still very large.

By determining the aggregation degree of Cuboid, the data amount of Cuboid that needs to be accessed to complete the query can be clearly mastered, and therefore, the return efficiency of the query is determined.

Step S106: executing query processing on the query request in a first distributed query engine when the degree of aggregation of the cube data under the preset dimensional combination is high;

When the degree of aggregation of the cube data under the preset dimensional combination is high, it is necessary to execute the query processing on the query request in the first distributed query engine. According to a determination result, the first distributed query engine needs to be a query engine which is executable when the degree of aggregation of the cube data under the preset dimensional combination is relatively high.

It should be noted that the first distributed query engine only needs to meet performance advantages, is not specifically limited in the embodiment of the present application, and only needs to meet performance advantage conditions.

Step S108: switching to a second distributed query engine to execute query processing on the query request when the degree of aggregation of the cube data under the preset dimensional combination is low.

When the degree of aggregation of the cube data under the preset dimensional combination is low, it is necessary to execute query processing on the query request in the second distributed query engine. According to a determination result, the second distributed query engine needs to be a query engine which is executable when the degree of aggregation of the cube data under the preset dimensional combination is relatively low.

It should be noted that the second distributed query engine only needs to meet stability and reliability advantages, is not specifically limited in the embodiment of the present application, and only needs to meet reliability conditions.

Through route switching, both the performance advantages of the first distributed query engine and the stability and reliability advantages of the second distributed query engine can be acquired.

From the above description, it can be seen that the present application achieves the following technical effects:

In the embodiment of the present application, a mode for pre-obtaining cube data under the preset dimensional combination in the pre-computing system is used; by determining the degree of aggregation of the cube data selected as expected under the preset dimensional combination after the query request is received, the objects of executing query processing on the query request in the first distributed query engine when the degree of aggregation of the cube data under the preset dimensional combination is high, and switching to the second distributed query engine to execute query processing on the query request when the degree of aggregation of the cube data under the preset dimensional combination is low are reached, thereby achieving the technical effects of stable utilization of the pre-computing result and quick response to a query request from a customer, and further solving the technical problem that the query response speed of the pre-computing query system is not ideal.

Figure 2:
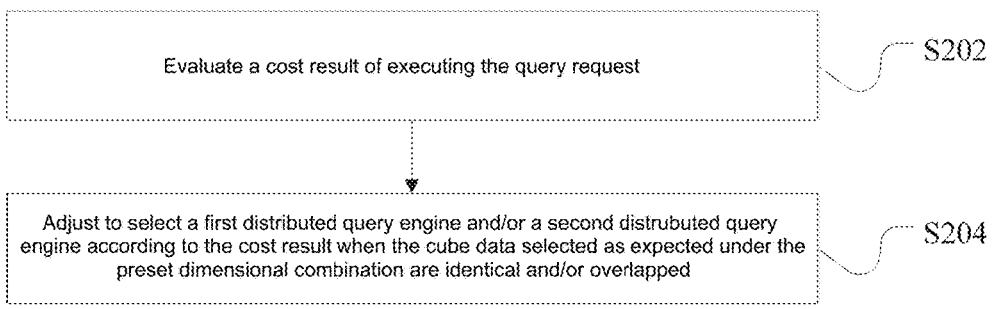
FIG. 2 is a schematic flowchart of a dynamic routing method for a query engine in a pre-computing system according to Embodiment II of the present application.

According to an embodiment of the present application, as a preference in this embodiment, as shown in FIG. 2, when the degree of aggregation of the cube data selected as expected under the preset dimensional combination is determined after a query request is received, the method further includes:

Step S202: evaluating a cost result of executing the query request; and

When the degree of aggregation of the cube data selected as expected under the preset dimensional combination is determined, it is also necessary to consider a query cost. A determination result can be revised or supplemented by establishing a preset cost rule base.

Step S204: adjusting to select a first distributed query engine or a second distributed query engine according to the cost result when the cube data selected as expected under the preset dimensional combination are identical and/or overlapped.

When the cube data selected as expected under the preset dimensional combination are identical, it means that the query request selects the identical Cuboid.

When the cube data selected as expected under the preset dimensional combination are overlapped, it means that the query request selects Cuboids which are covered with each other or overlapped with each other.

For example, even if two received query requests of different dimensions select the identical Cuboid, ways of using the Cuboids may still be quite different.

It should be noted that the query requests of different dimensions may affect the ways of using the Cuboids, which is only a preferred implementation solution in this embodiment and does not represent limitation of the implementation mode in the present application.

Specifically, when both queries hit the Cuboid, one type of query request may involve a large amount of data scanning while the other type of query request can accurately obtain only part of the data to complete a query. Through a cost settlement result of a pre-set cost rule base, identifying a cost of the query in one type of query request needs to scan most of data of the Cuboid, and there is potential single point of risk during summarization. The query in the other type of query request only needs to scan a small amount of Cuboid data, and single point of risk is relatively small. Therefore, the characteristics of the two types of query request are obviously different, resulting in a situation where the second distributed query engine is suitable to select for one type of query request while the first distributed query engine is suitable to select for the other type of query request.

Figure 3:
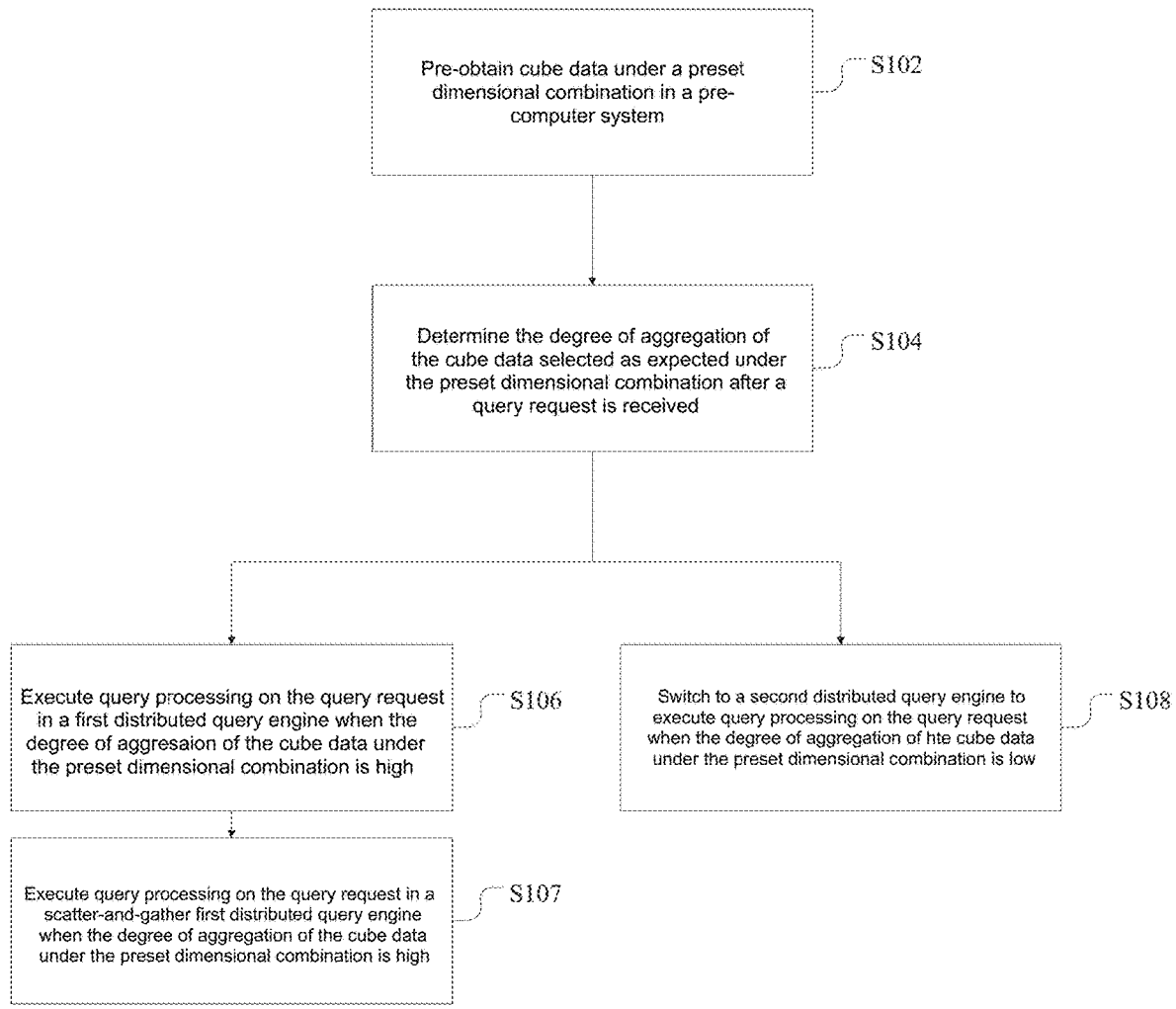
FIG. 3 is a schematic flowchart of a dynamic routing method for a query engine in a pre-computing system according to Embodiment III of the present application.

According to an embodiment of the present application, as a preference in this embodiment, as shown in FIG. 3, the executing query processing on the query request in a first distributed query engine when the degree of aggregation of the cube data under the preset dimensional combination is high includes:

Step S107: executing query processing on the query request in a scatter-and-gather first distributed query engine when the degree of aggregation of the cube data under the preset dimensional combination is high.

The first distributed query engine scatter-and-gather is a distributed computing model. In the distributed computing model scatter-and-gather, data are stored on the node where each slave is located, a data requester sends a data request to each slave separately, and data summarization is completed in its own memory of the requester. The summarization generally refers to reprocessing of pre-aggregated data.

The scatter-and-gather distributed model has the advantages of simple implementation and high performance, especially in the query request scene where the data requester only needs to obtain a small amount of data from each slave, and the total amount of data summarized in the end is not very large.

Figure 4:
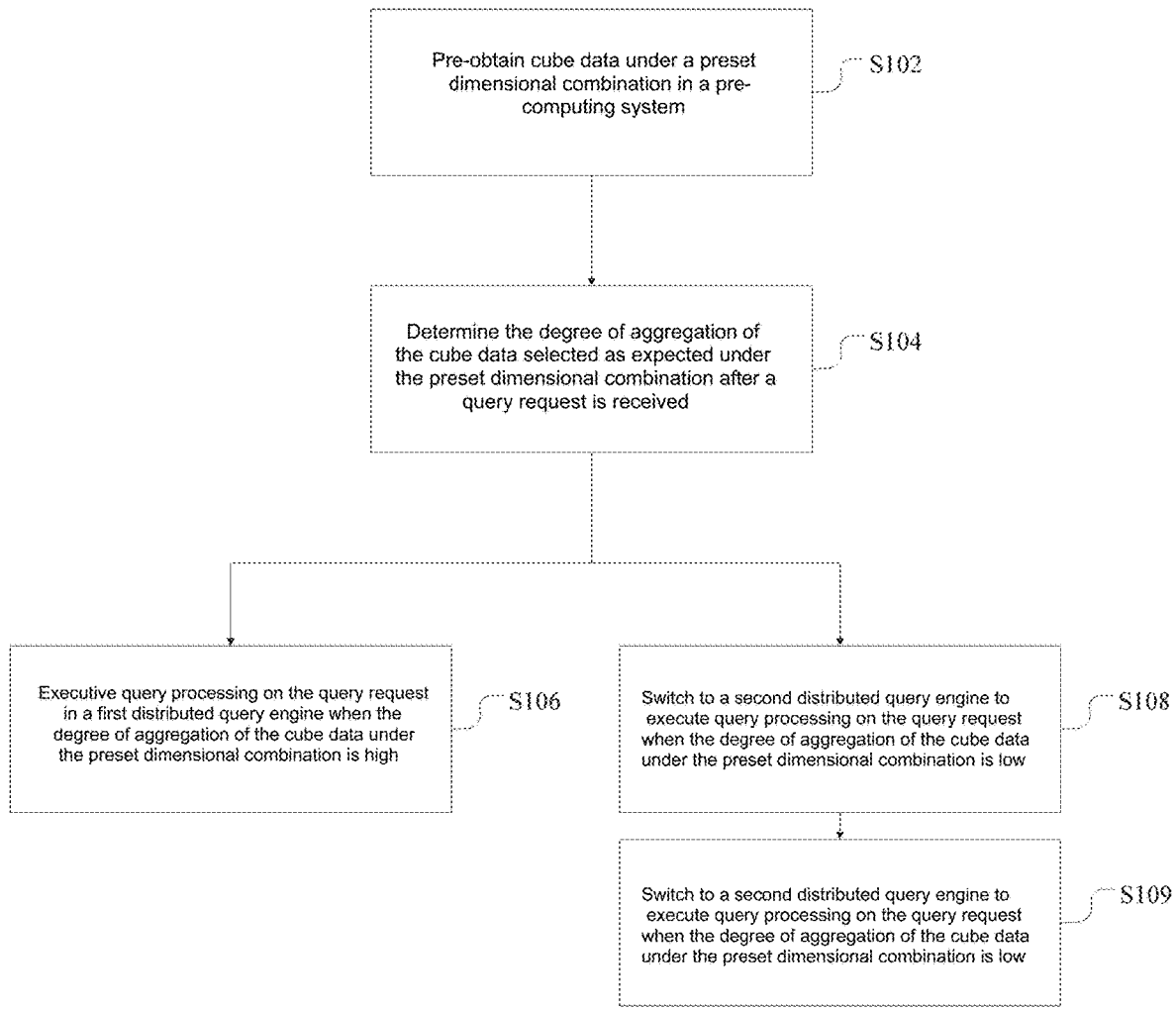
FIG. 4 is a schematic flowchart of a dynamic routing method for a query engine in a pre-computing system according to Embodiment IV of the present application.

According to an embodiment of the present application, as a preference in this embodiment, as shown in FIG. 4, the switching to a second distributed query engine to execute query processing on the query request when the degree of aggregation of the cube data under the preset dimensional combination is low includes:

Step S109: switching to a total-exchange second distributed query engine to execute query processing on the query request when the degree of aggregation of the cube data under the preset dimensional combination is low.

The second distributed query engine total-exchange is also a distributed computing model. In the total-exchange model, data are stored on the node where each slave is located, and a data requester sends a data request to each slave separately. The slaves communicate with one another to complete data summarization, and directly return a summarized result to the data requester in the end. The data requester does not need to do any data summarization work.

The scatter-and-gather distributed model has the advantage that the problem of single point of bottleneck can be effectively avoided in the situation where the amount of data that needs to be summarized is very large.

Figure 5:
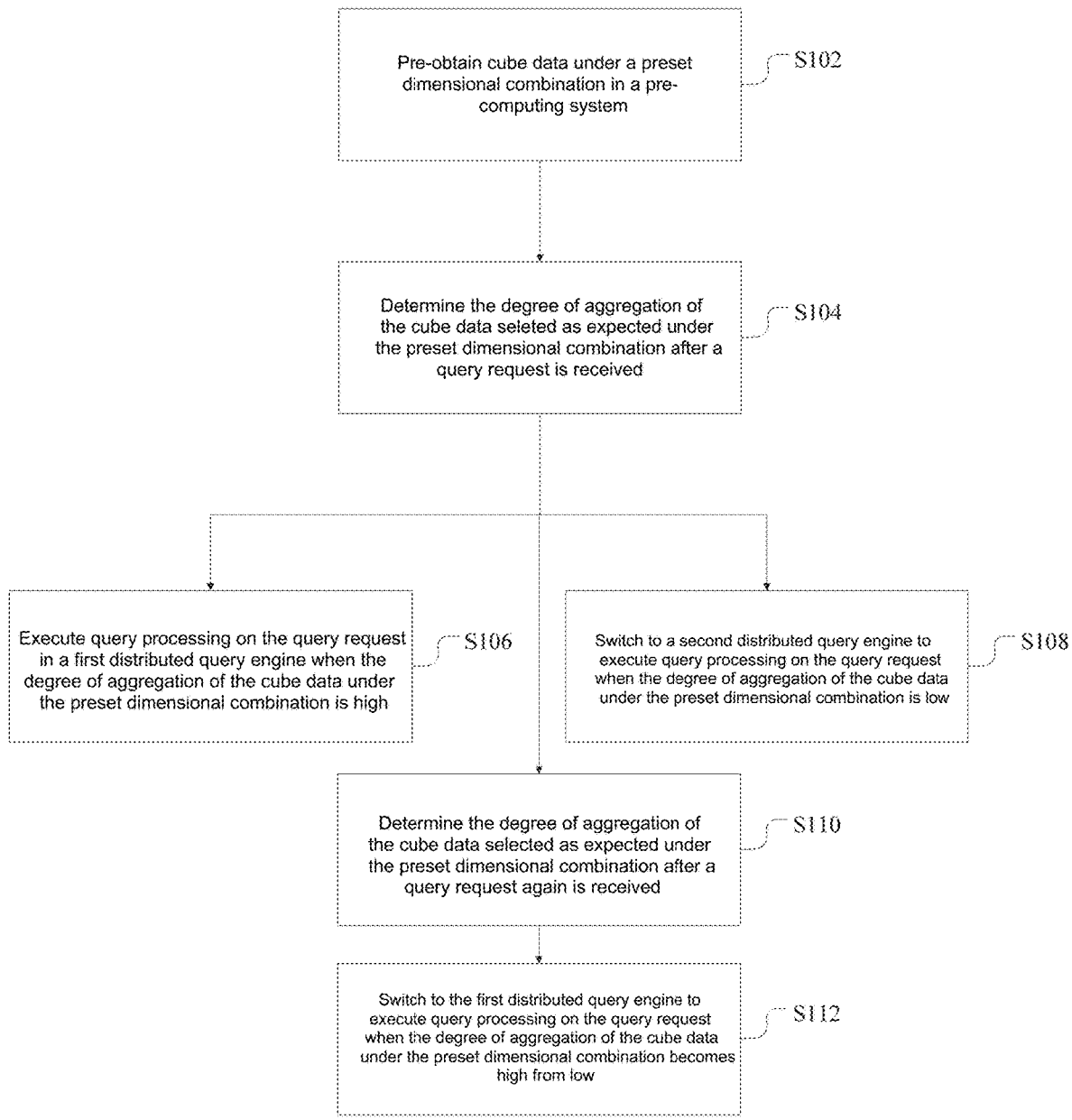
FIG. 5 is a schematic flowchart of a dynamic routing method for a query engine in a pre-computing system according to Embodiment V of the present application.

According to an embodiment of the present application, as a preference in this embodiment, as shown in FIG. 5, after the switching to a second distributed query engine to execute query processing on the query request when the degree of aggregation of the cube data under the preset dimensional combination is low, the method further includes:

Step S11: determining the degree of aggregation of the cube data selected as expected under the preset dimensional combination after a query request is received again;

Because it is necessary to perform dynamic routing adjustment, after the query request is received again, it is necessary to re-determine the degree of aggregation of the cube data selected as expected under the preset dimensional combination, and continue to perform the following operation. That is to say, each time when a query request is received, it is necessary to determine the degree of aggregation of the cube data selected as expected under the preset dimensional combination.

Step S112: switching to the first distributed query engine to execute query processing on the query request when the degree of aggregation of the cube data under the preset dimensional combination becomes high from low.

When the degree of aggregation of the cube data under the preset dimensional combination becomes high from low, a route is dynamically switched to the first distributed query engine to execute query processing on the query request. That is to say, according to change conditions of the degree of aggregation, for example, from low to high, using the first distributed query engine to execute query processing on the query request is switched to.

In addition, when the above operation of determining the degree of aggregation of the cube data selected as expected under the preset dimensional combination is executed, it is also necessary to evaluate a cost result of executing the query request. When the cube data selected as expected under the preset dimensional combination are identical and/or overlapped, adjustment is performed according to the cost result to select the first distributed query engine or the second distributed query engine. That is to say, it is necessary to compute a query cost according to a preset cost-based rule base and determine whether to adjust selection of a distributed query engine.

Through the above operation, a dynamic and intelligent query engine routing mechanism is realized, such that the performance, efficiency and stability of the pre-computing system can be improved. According to meta-information in a pre-computing result and characteristics of a query itself, an optimal distributed computing model can be dynamically and intelligently selected.

It should be noted that steps shown in a flowchart of accompanying drawings can be executed, for example, in a computer system for a set of computer-executable instructions, and although a logical sequence is shown in the flowchart, in some cases, the steps shown or described can be executed in a sequence different from that stated herein.

Figure 6:
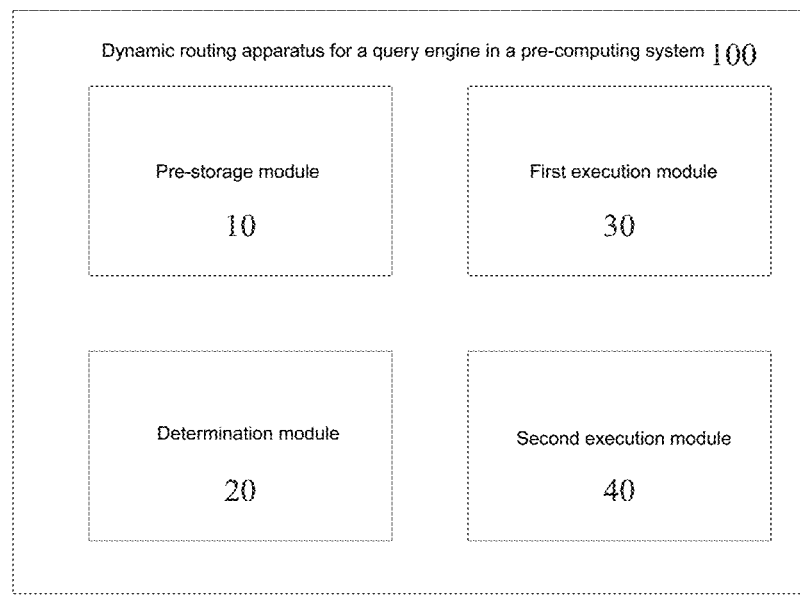
FIG. 6 is a schematic structural diagram of a dynamic routing apparatus for a query engine in a pre-computing system according to Embodiment I of the present application.

According to an embodiment of the present application, there is further provided an apparatus for implementing the dynamic routing method for the query engine in the pre-computing system, as shown in FIG. 6, and the apparatus includes: a pre-storage module 10 configured to pre-obtain cube data under a preset dimensional combination in the pre-computing system; a determination module 20 configured to determine the degree of aggregation of the cube data selected as expected under the preset dimensional combination after a query request is received; a first execution module 30 configured to execute query processing on the query request in a first distributed query engine when the degree of aggregation of the cube data under the preset dimensional combination is high; and a second execution module 40 configured to switch to a second distributed query engine to execute query processing on the query request when the degree of aggregation of the cube data under the preset dimensional combination is low.

In the pre-storage module 10 of the embodiment of the present application, the pre-computing system used has the following characteristics: the pre-computing system can use an off-line operation in advance, and pre-compute a measurement result of aggregation according to dimensions as cube data, namely Cube data, wherein the Cube data are aggregated, and are subjected to dimensional screening and measurement, and therefore, the amount of the Cube data is generally much smaller than that of original data.

Further, the Cube data are a set of pre-computing results, each element in the set is a measurement result under a certain dimensional combination, and the Cube data are regarded as cube data under a preset dimensional combination, namely a Cuboid.

It can be understood that for different queries, cube data selected as expected or the cube data under the preset dimensional combination in the pre-computing query system are different.

According to the characteristics of the above pre-computing system, the number of rows, the size, cardinality and other characteristics of each pre-computed Cuboid can be known and cached in a system memory before a query request from a user is received.

Specifically, pre-obtaining cube data under a preset dimensional combination in the pre-computing system means that what a query engine in the pre-computing system faces is not the original data, but the aggregated Cube data or Cuboid.

In the determination module 20 of the embodiment of the present application, after the query request is received, it is necessary to determine the degree of aggregation of the cube data, namely Cuboid, selected as expected under the preset dimensional combination. For example, when a query selects a high-aggregation-level Cuboid, if the Cuboid is a Cuboid which is specifically aggregated according to the age dimension, the data amount of Cuboid that needs to be accessed to complete the query is very small; and if a query selects a low-aggregation-level Cuboid aggregated according to an insurer+date dimension, the data amount of Cuboid that needs to be accessed is still very large.

By determining the aggregation degree of Cuboid, the data amount of Cuboid that needs to be accessed to complete the query can be clearly mastered, and therefore, the return efficiency of the query is determined.

In the first execution module 30 of the embodiment of the present application, it is necessary to execute query processing on the query request in a first distributed query engine when the degree of aggregation of the cube data under the preset dimensional combination is high. According to a determination result, the first distributed query engine needs to be a query engine which is executable when the degree of aggregation of the cube data under the preset dimensional combination is relatively high.

It should be noted that the first distributed query engine only needs to meet performance advantages, is not specifically limited in the embodiment of the present application, and only needs to meet performance advantage conditions.

In the second execution module 40 of the embodiment of the present application, it is necessary to execute query processing on the query request in a second distributed query engine when the degree of aggregation of the cube data under the preset dimensional combination is low. According to a determination result, the second distributed query engine needs to be a query engine which is executable when the degree of aggregation of the cube data under the preset dimensional combination is relatively low.

It should be noted that the second distributed query engine only needs to meet stability and reliability advantages, is not specifically limited in the embodiment of the present application, and only needs to meet reliability conditions.

Through route switching, both the performance advantages of the first distributed query engine and the stability and reliability advantages of the second distributed query engine can be acquired.

Figure 7:
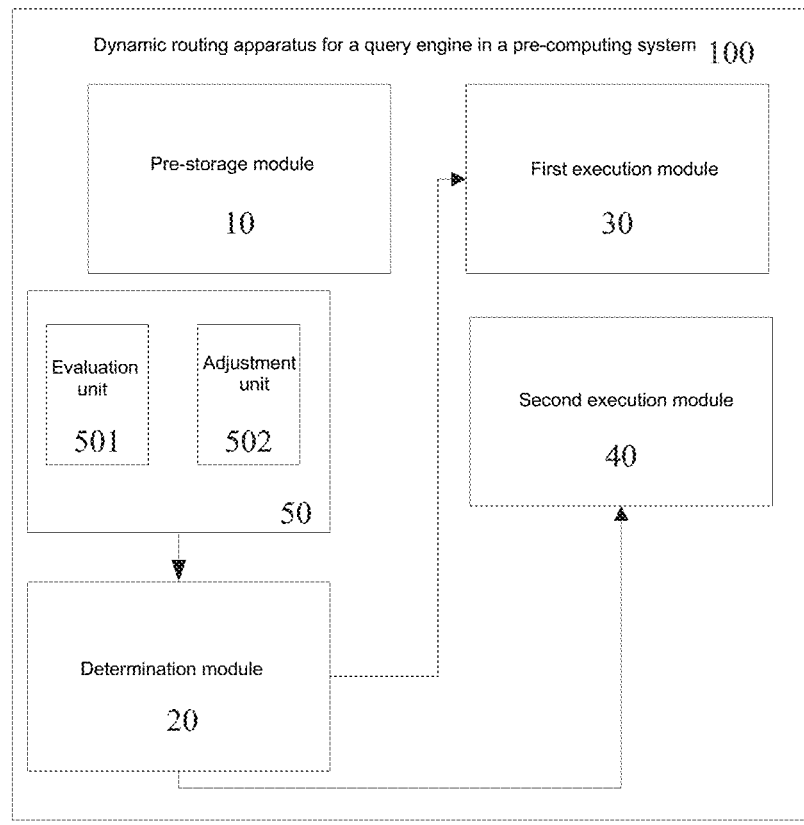
FIG. 7 is a schematic structural diagram of a dynamic routing apparatus for a query engine in a pre-computing system according to Embodiment II of the present application.

According to an embodiment of the present application, as a preference in this embodiment, as shown in FIG. 7, the apparatus further includes a cost rule module 50 which includes an evaluation unit 501 configured to evaluate a cost result of executing the query request; an adjustment unit 502 configured to adjust to select the first distributed query engine or the second distributed query engine according to the cost result when the cube data selected as expected under the preset dimensional combination are identical and/or overlapped.

In the evaluation unit 501 of the embodiment of the present application, when the degree of aggregation of the cube data selected as expected under the preset dimensional combination is determined, it is also necessary to consider a query cost. A determination result can be revised or supplemented by establishing a preset cost rule base.

In the adjustment unit 502 of the embodiment of the present application, when the cube data selected as expected under the preset dimensional combination are identical, it means that the query request selects the identical Cuboid.

When the cube data selected as expected under the preset dimensional combination are overlapped, it means that the query request selects Cuboids which are covered with each other or overlapped with each other.

For example, even if two received query requests of different dimensions select the identical Cuboid, ways of using the Cuboids may still be quite different.

It should be noted that the query requests of different dimensions may affect the ways of using the Cuboids, which is only a preferred implementation solution in this embodiment and does not represent limitation of the implementation mode in the present application.

Specifically, when both queries hit the Cuboid, one type of query request may involve a large amount of data scanning while the other type of query request can accurately obtain only part of the data to complete a query. Through a cost settlement result of a pre-set cost rule base, identifying a cost of the query in one type of query request needs to scan most of data of the Cuboid, and there is potential single point of risk during summarization. The query in the other type of query request only needs to scan a small amount of Cuboid data, and single point of risk is relatively small. Therefore, the characteristics of the two types of query request are obviously different, resulting in a situation where the second distributed query engine is suitable to select for one type of query request while the first distributed query engine is suitable to select for the other type of query request.

Figure 8:
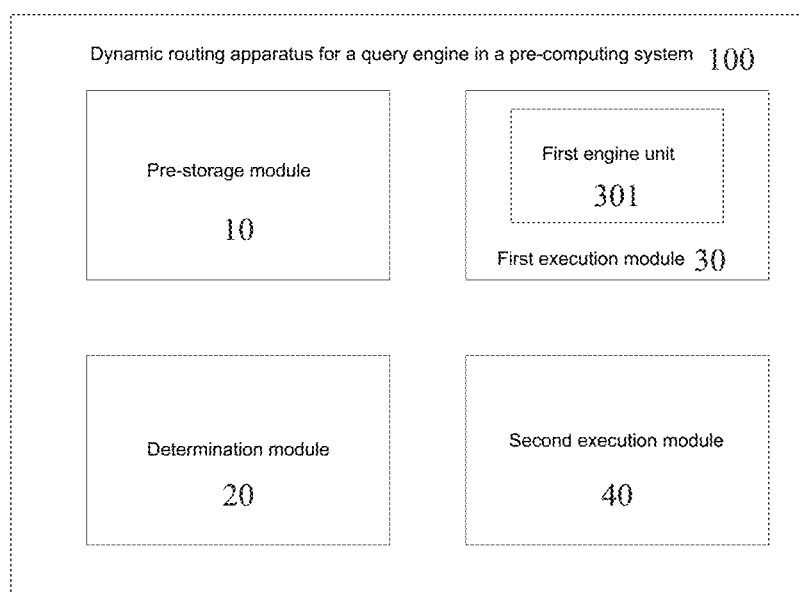
FIG. 8 is a schematic structural diagram of a dynamic routing apparatus for a query engine in a pre-computing system according to Embodiment III of the present application.

According to an embodiment of the present application, as a preference in this embodiment, as shown in FIG. 8, the first execution module includes a first engine unit 301 configured to execute query processing on the query request in a scatter-and-gather first distributed query engine when the degree of aggregation of the cube data under the preset dimensional combination is high.

In the first engine unit 301 of the embodiment of the present application, the first distributed query engine scatter-and-gather is a distributed computing model. In the distributed computing model scatter-and-gather, data are stored on the node where each slave is located, a data requester sends a data request to each slave separately, and data summarization is completed in its own memory of the requester. The summarization generally refers to reprocessing of pre-aggregated data.

The scatter-and-gather distributed model has the advantages of simple implementation and high performance, especially in the query request scene where the data requester only needs to obtain a small amount of data from each slave, and the total amount of data summarized in the end is not very large.

Figure 9:
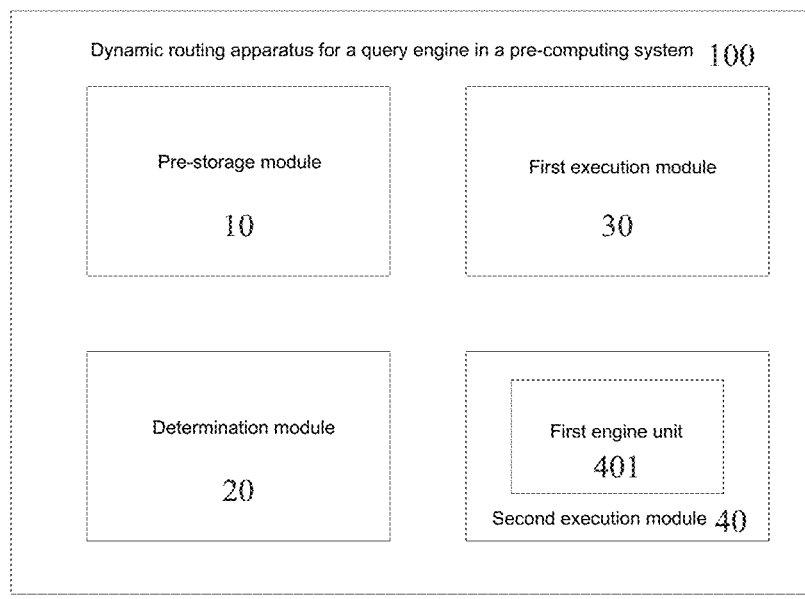
FIG. 9 is a schematic structural diagram of a dynamic routing apparatus for a query engine in a pre-computing system according to Embodiment IV of the present application.

According to an embodiment of the present application, as a preference in this embodiment, as shown in FIG. 9, the second execution module includes a second engine unit 401 configured to switch to a total-exchange second distributed query engine to execute query processing on the query request when the degree of aggregation of the cube data under the preset dimensional combination is low.

In the second engine unit 401 of the embodiment of the present application, the second distributed query engine total-exchange is also a distributed computing model. In the total-exchange model, data are stored on the node where each slave is located, and a data requester sends a data request to each slave separately. The slaves communicate with one another to complete data summarization, and directly return a summarized result to the data requester in the end. The data requester does not need to do any data summarization work.

The scatter-and-gather distributed model has the advantage that the problem of single point of bottleneck can be effectively avoided in the situation where the amount of data that needs to be summarized is very large.

Figure 10:
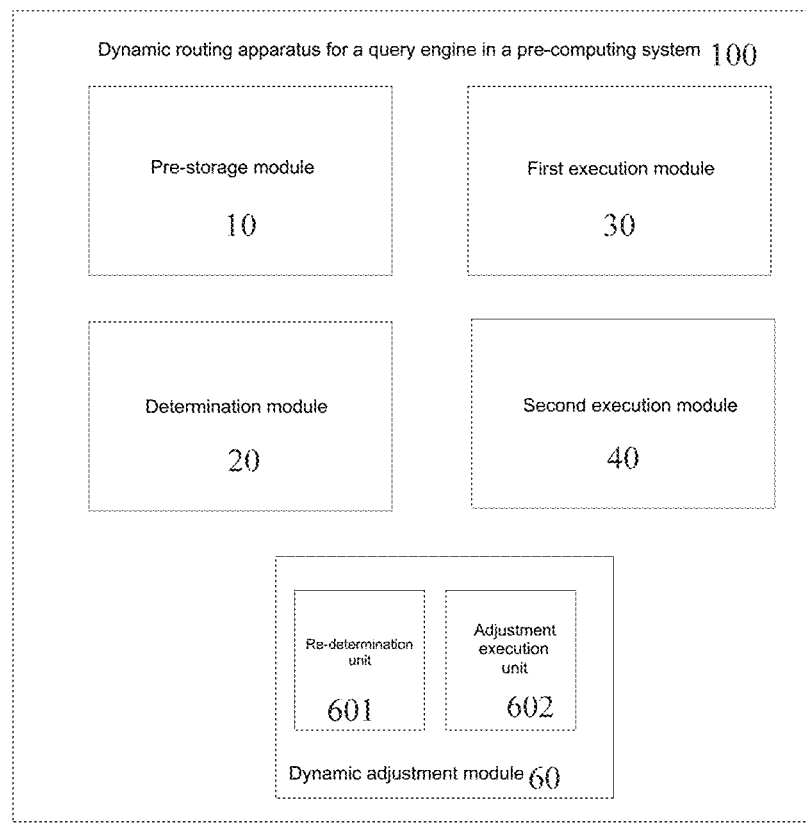
FIG. 10 is a schematic structural diagram of a dynamic routing apparatus for a query engine in a pre-computing system according to Embodiment V of the present application.

According to an embodiment of the present application, as a preference in this embodiment, as shown in FIG. 10, the apparatus further includes a dynamic adjustment module 60 which includes a re-determination unit 601 configured to determine the degree of aggregation of the cube data selected as expected under the preset dimensional combination after a query request is received again; and an adjustment execution unit 602 configured to switch to a first distributed query engine to execute query processing on the query request when the degree of aggregation of the cube data under the preset dimensional combination becomes high from low.

In the re-determination unit 601 of the embodiment of the present application, because it is necessary to perform dynamic routing adjustment, after the query request is received again, it is necessary to re-determine the degree of aggregation of the cube data selected as expected under the preset dimensional combination, and continue to perform the following operation. That is to say, each time when a query request is received, it is necessary to determine the degree of aggregation of the cube data selected as expected under the preset dimensional combination.

In the adjustment execution unit 602 of the embodiment of the present application, when the degree of aggregation of the cube data under the preset dimensional combination becomes high from low, a route is dynamically switched to the first distributed query engine to execute query processing on the query request. That is to say, according to change conditions of the degree of aggregation, for example, from low to high, using the first distributed query engine to execute query processing on the query request is switched to.

In addition, when the above operation of determining the degree of aggregation of the cube data selected as expected under the preset dimensional combination is executed, it is also necessary to evaluate a cost result of executing the query request. When the cube data selected as expected under the preset dimensional combination are identical and/or overlapped, adjustment is performed according to the cost result to select the first distributed query engine or the second distributed query engine. That is to say, it is necessary to compute a query cost according to a preset cost-based rule base and determine whether to adjust selection of a distributed query engine.

Through the above operation, a dynamic and intelligent query engine routing mechanism is realized, such that the performance, efficiency and stability of the pre-computing system can be improved. According to meta-information in a pre-computing result and characteristics of a query itself, an optimal distributed computing model can be dynamically and intelligently selected.

Obviously, those skilled in the art should understand that the above modules or steps of the present application can be implemented through a general computing apparatus, and can be concentrated on a single computing apparatus or distributed in a network composed of multiple computing apparatuses. Alternatively, they can be implemented with computing apparatus-executable program codes so that they can be stored in a storage apparatus to be executed by the computing apparatus, or they can be made into individual integrated circuit modules, or a plurality of modules or steps thereof can be made into a single integrated circuit module for implementation. In this way, the present application is not limited to any specific hardware and software combination.

An implementation principle of the present application is as follows:

A traditional general query system can perform lexical analysis, syntax analysis, logical analysis, physical analysis, etc. on the SQL query, and a final execution plan will be configured in a physical environment to process full table data.

With an SQL query statement "select sum(amount), city from transactions group by city" as an example, for a pre-computing query system, original data can be processed off-line in advance in the pre-computing query system, a user can define a critical dimension (such as the above "city") and measurement (such as the above "sum(amount)") in advance so that the system can use an off-line operation in advance to pre-compute a measurement result of aggregation according to the dimension. A set of the above results is generally called a Cube in an OLAP system. The Cube data are aggregated and are subjected to dimensional screening and measurement, and therefore, the amount of the Cube data is usually much smaller than that of original data. When the query really arrives, the query is directly answered with the data in the Cube instead of using the original data. The data amount that needs to be processed is much smaller. Sometimes the difference of the data amount is the relationship between O(N) and O(1), wherein N is the number of rows of the original data.

Different from a general query engine, the query engine in a pre-computing OLAP system faces aggregated Cube other than the original data. The Cube is a set of pre-computing results, each element in the set is a measurement result under a certain dimensional combination, and the Cube can be called as a Cuboid. For example, a Cube may be generated in a transaction table of an insurance company, which includes a Cuboid 1 which is the total amount of transactions aggregated according to cities, and a Cuboid 2 which may be the maximum transaction number aggregated according to insurance salespersons. Different Cuboids are from the same original data, but may be different in the number of rows, the number of columns, and size thereof.

For different queries, a Cube and/or a Cuboid selected as expected from the pre-computing query system is different. This provides a lot of choices for a distributed physical execution model:

When a certain query selects a high-aggregation-level Cuboid, namely a Cuboid with the number of rows very small, such as a Cuboid which is aggregated according to the age dimension, the data amount of cuboid that needs to be accessed to complete this query is very small. If a query selects a low-aggregation-level Cuboid, namely a Cuboid with the number of rows great, which is aggregated according to an insurer+date dimension, the data amount of cuboid that needs to be accessed is still very large.

The dynamic routing method for the query engine in the pre-computing system of the present application achieves an intelligent routing mechanism in the query engine of the pre-computing system on the basis of the rule base and pre-computing meta-information, which allows the pre-computing query system to aim at shortening query response time and simultaneously guaranteeing system stability, and to be automatically switched between a scatter-and-gather engine and a total-exchange engine.

Figure 11:
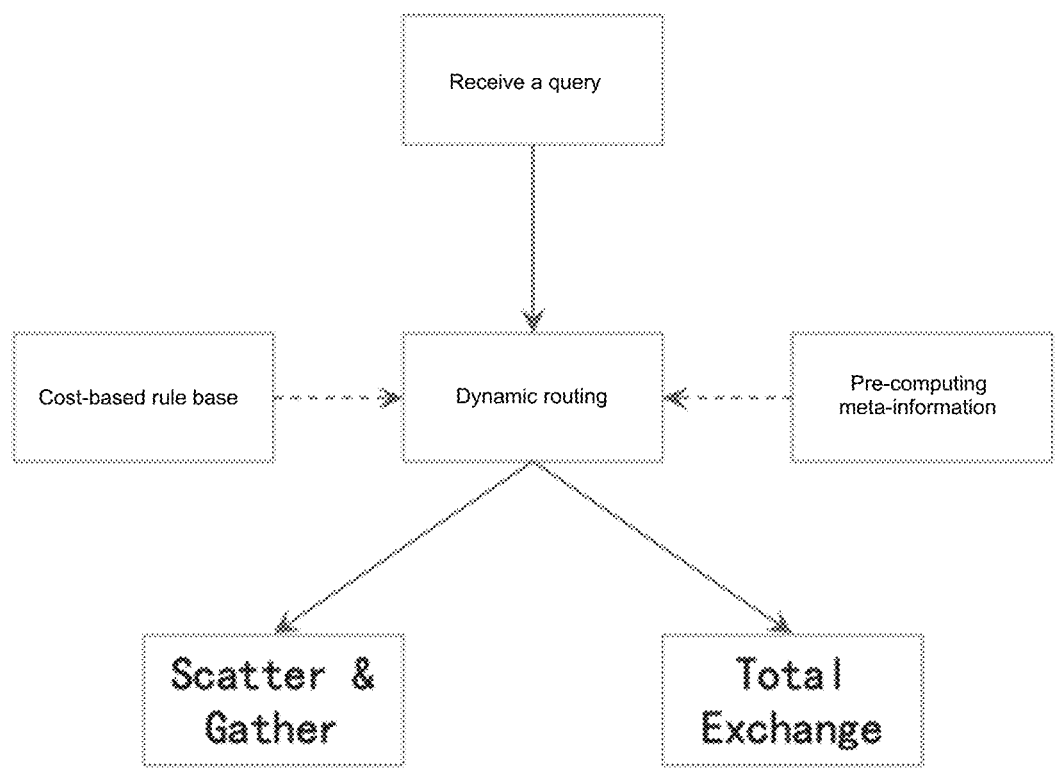
FIG. 11 is a schematic diagram of an implementation principle in the present application.

As shown in FIG. 11, due to the characteristics of pre-computing, the number of rows, the size, cardinality and other characteristics of each pre-computed cuboid can be known and cached in a memory before a query arrives, such that a dynamic routing module can access the meta-information at a low cost.

As shown in FIG. 11, the dynamic routing module can use a basic principle: namely a scatter-and-gather model is used to serve a Cuboid with a high degree of aggregation, and a total-exchange model is used to serve a Cuboid with a low degree of aggregation. In this way, both the performance advantages of the scatter-and-gather engine and the stability and reliability advantages of the total-exchange can be acquired. At the same time, the intelligent routing module also relies on a certain rule base to supplement this simple principle. Even if two query requests select the identical Cuboid, ways of using the Cuboid may be quite different.

Specifically, if there is a cuboid whose dimension is an insurance salesperson (seller_id) and date (date), and measurement is the sum of the insurance policy amount: sum (amount), since the number of salespersons may be large, the degree of aggregation of Cuboid may not be very high. Data content corresponding to the Cuboid may be as shown in the following table, and is a result of summarizing transaction amount according to a daily sales record of each salesperson:

TABLE 1

(Assuming there are a total of 100,000 salespersons, the remaining 100,000 rows of pre-computing results are omitted)

| Seller_Id | Date | Sum(amount) |
| --- | --- | --- |
| 10001 | 1.1 | 100 |
| 10001 | 1.2 | 200 |
| 10002 | 1.1 | 150 |
| 10003 | 1.2 | 80 |
| 10003 | 1.3 | 30 |

Specifically, for two query statements SQL 1 and SQL 2:

For example, the SQL 1 query statement is to analyze a total daily turnover of a new salesperson whose job ID is greater than 10002: select sum(amount), date from transactions where seller_id>10002 group by date order by date The SQL 2 query statement is to analyze a total turnover of a salesperson with the number 10003 on January 1st: select sum(amount) from transactions where date='1.1' and seller_id='10003'

Both SQL queries mentioned above can hit the Cuboid of the above Table 1, the SQL 1 may involve a large amount of data scanning while the SQL 2 can accurately acquire only part of the data to complete a query. Through effect of a rule base, identifying query cost in the SQL 1 needs to scan most of data of the Cuboid, and there is potential single point of risk when summarization is further performed. A query in the SQL 2 only needs to scan a small amount of Cuboid data, and single point of risk is relatively small. It can be seen from the above analysis that there are obvious differences in the characteristics of the two query statements, which results in that the total-exchange model is suitable to select for the SQL1, and the scatter-and-gather model is suitable to select for the SQL2.

Figure 12:
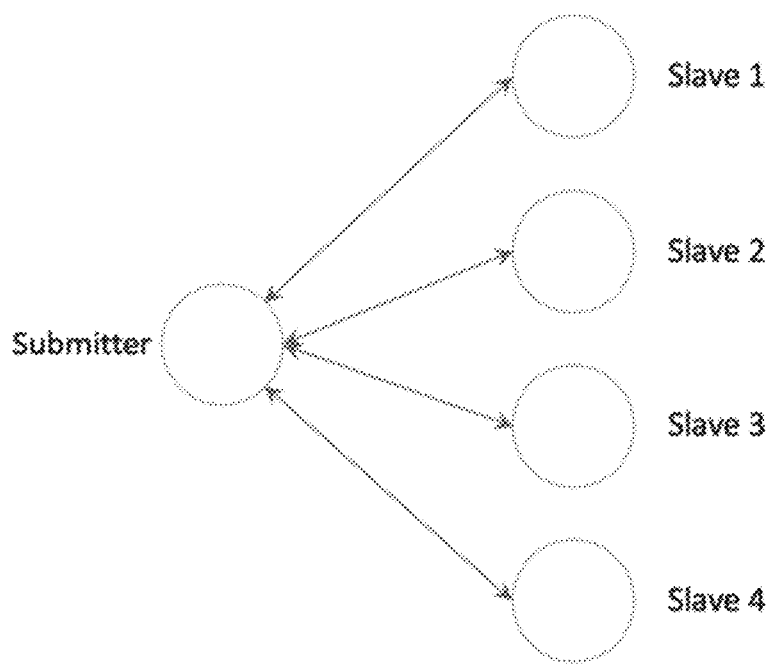
FIG. 12 is a schematic principle diagram of a scatter-and-gather model.

FIG. 12 is a schematic principle diagram of a scatter-and-gather model. In the scatter-and-gather model, data are stored on the node where each slave is located, a data requester sends a data request to each slave separately, and data summarization is completed in its own memory of the requester, wherein summarization generally means re-processing of pre-aggregated data. The scatter-and-gather model has the advantages of simple implementation and high performance, especially in the situation where the data requester only needs to acquire a small amount of data from each slave, and the total amount of data summarized in the end is not very large. However, if the amount of data that need to be summarized in the end reaches a certain scale, a large amount of data accumulate on a data requesting side, which may affect performance in minor cases, and even cause a process of the data requester to be crashed in severe cases.

Figure 13:
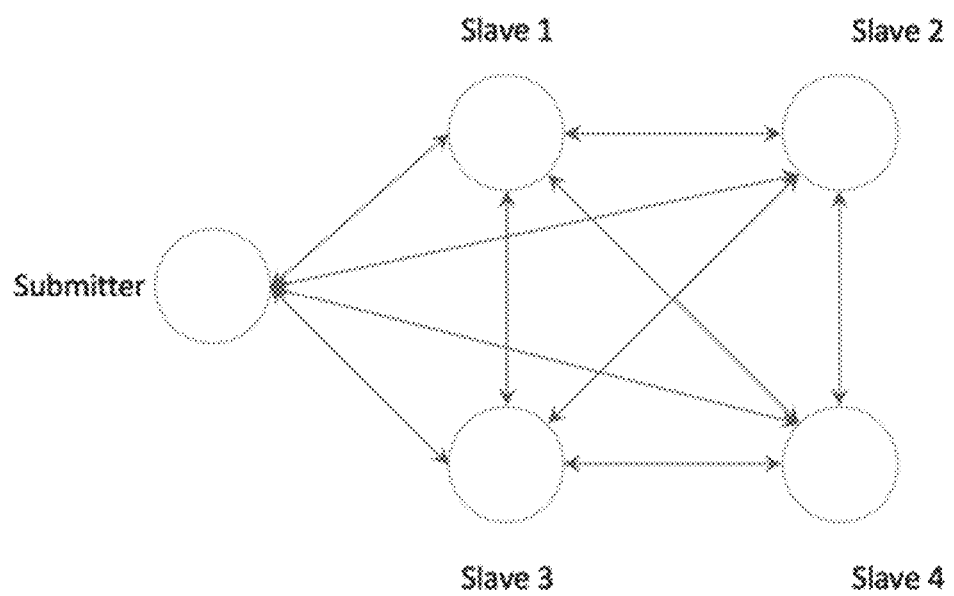
FIG. 13 is a schematic principle diagram based on a total-exchange model.

FIG. 13 is a schematic principle diagram of a total-exchange model. In the total-exchange model, data are stored on the node where each slave is located, and a data requester sends a data request to each slave separately. The slaves communicate with one another to complete data summarization, and directly return a summarized result to the data requester in the end. The data requester does not need to do any data summarization work. The problem of single point of bottleneck can be effectively avoided in the situation where the amount of data that need to be summarized is very large. Thus, it is a more reliable and stable design solution.

What is mentioned above is merely a preferred embodiment of the present application and is not intended to limit the present application, and for those skilled in the art, the present application can be variously modified and changed. Any modification, equivalent substitution, improvement, and the like within the spirit and principles of the present application should fall within the scope of protection of the present application.

What is claimed is:

1. A dynamic routing method for a query engine in a pre-computing system, comprising:
    pre-obtaining cube data under a preset dimensional combination in the pre-computing system;
    determining a degree of aggregation of the cube data selected as expected under the preset dimensional combination after a query request is received;
    executing query processing on the query request in a first distributed query engine when the degree of aggregation of the cube data under the preset dimensional combination is high; and
    switching to a second distributed query engine to execute query processing on the query request when the degree of aggregation of the cube data under the preset dimensional combination is low.

2. The dynamic routing method according to claim 1, wherein when determining the degree of aggregation of the cube data selected as expected under the preset dimensional combination after a query request is received, the method further comprises:
    evaluating a cost result of executing the query request; and
    adjusting to select the first distributed query engine or the second distributed query engine according to the cost result when the cube data selected as expected under the preset dimensional combination are identical, partially overlapped or mutually covered.

3. The dynamic routing method according to claim 1, wherein the executing query processing on the query request in the first distributed query engine when the degree of aggregation of the cube data under the preset dimensional combination is high includes:
    executing query processing on the query request in a scatter-and-gather first distributed query engine when the degree of aggregation of the cube data under the preset dimensional combination is high.

4. The dynamic routing method according to claim 1, wherein the switching to the second distributed query engine to execute query processing on the query request when the degree of aggregation of the cube data under the preset dimensional combination is low includes:
    switching to a total-exchange second distributed query engine to execute query processing on the query request when the degree of aggregation of the cube data under the preset dimensional combination is low.

5. The dynamic routing method according to claim 1, wherein after the switching to a second distributed query engine to execute query processing on the query request when the degree of aggregation of the cube data under the preset dimensional combination is low, the method further comprises:
    determining the degree of aggregation of the cube data selected as expected under the preset dimensional combination after a query request is received again; and
    switching to the first distributed query engine to execute query processing on the query request when the degree of aggregation of the cube data under the preset dimensional combination becomes high from low.

6. A dynamic routing apparatus for a query engine in a pre-computing system, comprising:
    a pre-storage module, configured to pre-obtain cube data under a preset dimensional combination in the pre-computing system;
    a determination module, configured to determine a degree of aggregation of the cube data selected as expected under the preset dimensional combination after a query request is received;
    a first execution module, configured to execute query processing on the query request in a first distributed query engine when the degree of aggregation of the cube data under the preset dimensional combination is high; and
    a second execution module, configured to switch to a second distributed query engine to execute query processing on the query request when the degree of aggregation of the cube data under the preset dimensional combination is low.

7. The dynamic routing apparatus according to claim 6, further comprising: a cost rule module, wherein the cost rule module includes:
    an evaluation unit, configured to evaluate a cost result of executing the query request; and
    an adjustment unit, configured to adjust to select the first distributed query engine or the second distributed query engine according to the cost result when the cube data selected as expected under the preset dimensional combination are identical and/or overlapped.

8. The dynamic routing apparatus according to claim 6, wherein the first execution module includes: a first engine unit,
    configured to execute query processing on the query request in a scatter-and-gather first distributed query engine when the degree of aggregation of the cube data under the preset dimensional combination is high.

9. The dynamic routing apparatus according to claim 6, wherein the second execution module includes: a second engine unit,
    configured to switch to a total-exchange second distributed query engine to execute query processing on the query request when the degree of aggregation of the cube data under the preset dimensional combination is low.

10. The dynamic routing apparatus according to claim 6, further comprising: a dynamic adjustment module, wherein the dynamic adjustment module includes:
    a re-determination unit, configured to determine the degree of aggregation of the cube data selected as expected under the preset dimensional combination after a query request is received again; and
    an adjustment and execution unit, configured to switch to the first distributed query engine to execute query processing on the query request when the degree of aggregation of the cube data under the preset dimensional combination becomes high from low.

* * * * *